(12) United States Patent
Van Steen

(10) Patent No.: US 8,479,475 B2
(45) Date of Patent: Jul. 9, 2013

(54) TRANSPORTABLE BOTTLING PLANT IN A CONTAINER

(75) Inventor: Christophe Armand Van Steen, Aartselaar (BE)

(73) Assignee: Conteno, Aartselaar (BE)

( * ) Notice: Subject to any disclaimer, the term of this patent is extended or adjusted under 35 U.S.C. 154(b) by 245 days.

(21) Appl. No.: 12/814,927

(22) Filed: Jun. 14, 2010

(65) Prior Publication Data

US 2011/0302881 A1   Dec. 15, 2011

(51) Int. Cl.
*B67C 7/00* (2006.01)

(52) U.S. Cl.
USPC ....... 53/111 RC; 53/127; 53/134.1; 53/136.1; 53/167; 53/561; 53/282; 53/393; 141/82; 220/1.5

(58) Field of Classification Search
USPC .............. 53/111 R, 111 RC, 127, 136.1, 167, 53/558, 561, 281, 282, 393, 134.1; 141/82; 220/1.5
IPC ......................................... B67C 7/00
See application file for complete search history.

(56) References Cited

U.S. PATENT DOCUMENTS

| | | | | |
|---|---|---|---|---|
| 795,040 | A * | 7/1905 | Hopkins | 53/111 RC |
| 4,587,793 | A * | 5/1986 | Brennan et al. | 53/111 R |
| 5,330,070 | A * | 7/1994 | Gerhard et al. | 220/1.5 |
| 6,134,866 | A * | 10/2000 | Schoenewolff et al. | 53/561 |
| 6,185,910 | B1 * | 2/2001 | Achhammer | 53/281 |
| 6,581,647 | B1 * | 6/2003 | Leidlein et al. | 53/282 |
| 7,581,367 | B2 * | 9/2009 | Bechini | 53/111 R |
| 2002/0104838 | A1 * | 8/2002 | Minkkinen | 220/1.5 |
| 2005/0188651 | A1 * | 9/2005 | Clusserath | 53/136.1 |
| 2008/0257975 | A1 * | 10/2008 | Matheis | 220/1.5 |

(Continued)

FOREIGN PATENT DOCUMENTS

| | | |
|---|---|---|
| DE | 3517074 A1 * | 11/1986 |
| DE | 19615454 | 10/1997 |

(Continued)

OTHER PUBLICATIONS

EPO machine translation of DE19615454, retrieved from http://translationportal.epo.org/...ORMAT=docdb&KIND=A1&LOCALE=en_EP&NUMBER=19615454&OPS=ops.epo.org&ENGINE=google&SRCLANG=de&TRGLANG=en, Jun. 13, 2012, 3 pages.*

(Continued)

*Primary Examiner* — Stephen F Gerrity
(74) *Attorney, Agent, or Firm* — Jerold I. Schneider

(57) ABSTRACT

The invention provides a transportable bottling plant integrated into a container. The container has a separation wall dividing the container into a bottling room and a technical room. A preform feeder, a bottle blowing unit, a filling and closing unit and first and second transferring devices are mounted in the bottling room. A power generator, an air compressor and an air conditioning unit are mounted in the technical room. The preform feeder comprises a recipient for receiving plastic bottle preforms and an ordering unit for ordering the preforms and feeding them towards the bottle blowing unit. The first transferring device is provided for transferring the preforms from the preform feeder to the bottle blowing unit. The bottle blowing unit comprises a heater for heating the preforms and a blow-molder for blow-molding the preforms into bottles. The second transferring device is provided for transferring the bottles from the bottle blowing unit to the filling and closing unit. The filling and closing unit comprises a filling unit for filling the bottles with a liquid and a closing unit for closing the bottles with caps.

16 Claims, 9 Drawing Sheets

U.S. PATENT DOCUMENTS

2010/0044369 A1* 2/2010 Toepfer et al. ............... 220/1.5
2010/0307973 A1* 12/2010 Grcevic ....................... 141/82
2011/0219728 A1* 9/2011 Humele ........................ 53/561

FOREIGN PATENT DOCUMENTS

| DE | 102008057403 A1 | * | 5/2010 | | |
|---|---|---|---|---|---|
| EP | 0359300 | | 3/1990 | | |
| FR | 2268667 | | 11/1975 | | |
| GB | 2128161 A | * | 4/1984 | | |
| JP | 04311436 A | * | 11/1992 | ............... | 53/134.1 |
| WO | WO 2007144491 A2 | * | 12/2007 | | |

OTHER PUBLICATIONS

EPO machine translation of DE3517074, retrieved from http://translationportal.epo.org/...FORMAT=docdb&KIND=A1&LOCALE=en_EP&NUMBER=3517074&OPS=ops.epo.org&ENGINE=google&SRCLANG=de&TRGLANG=en, Jun. 13, 2012, 4 pages.*

* cited by examiner

TRANSPORTABLE BOTTLING PLANT IN A CONTAINER

TECHNICAL FIELD

The present invention relates to a transportable bottling plant in a container.

BACKGROUND ART

Generally, a stationary bottling plant as known in the art comprises a preform feeder, which receives plastic bottle preforms and orders them for feeding to a bottle blowing unit, which in turn applies heat and air pressure to form bottles from the preforms, and a filling and closing unit for filling the bottles with a liquid, closing them with a cap and possibly also applying a handle, a label and a code identifying lot number and date. Between these units, transferring devices are used to transfer the preforms from the preform feeder to the bottle blowing unit and to transfer the bottles from the bottle blowing unit to the filling and closing unit.

Known bottling plants are stationary plants. In certain places in the world there is a need for quickly setting up a bottling plant. The known stationary bottling plants described above are not suited for this purpose.

DEFINITIONS

As used herein, with "container" is intended to mean a freight or shipping container of the type used for international freight transport.

As used herein, with "ISO standard container" is intended to mean a container as defined by the International Standardization Organization.

As used herein, with "air conditioning unit" is meant a unitary air conditioning system or the condenser unit of a split air conditioning system having separate condenser and evaporator units.

DISCLOSURE OF THE INVENTION

It is an aim of the invention to provide a complete transportable bottling plant, i.e. comprising for every step of the bottling process a machine or apparatus which can operate without manual intervention, which can be easily and quickly moved to and started up at a place of need.

It is a second aim of the invention to provide a transportable bottling plant, which can operate as a closed box.

It is a third aim of the invention to provide a transportable bottling plant, which has a low energy consumption.

According to the invention, an easily and quickly transportable bottling plant is provided with the various units being integrated into a container. The container has a front side, a back side, first and second lateral sides connecting the front and back sides, and a separation wall dividing the container into a bottling room at the front side and a technical room at the back side. A preform feeder, a bottle blowing unit, a filling and closing unit and first and second transferring devices are mounted in the bottling room. A power generator, an air compressor and an air conditioning unit are mounted in the technical room. The preform feeder comprises a recipient for receiving plastic bottle preforms and an ordering unit for ordering the preforms and feeding them towards the bottle blowing unit. The first transferring device is provided for transferring the preforms from the preform feeder to the bottle blowing unit. The bottle blowing unit comprises a heater for heating the preforms and a blow-moulder for blow-moulding the preforms into bottles. The second transferring device is provided for transferring the bottles from the bottle blowing unit to the filling and closing unit. The filling and closing unit comprises a filling unit for filling the bottles with a liquid and a closing unit for closing the bottles with caps. The power generator is electrically connected with the units mounted in the bottling room and is provided for generating electric power for these units. The air compressor is provided for compressing air and supplying the pressurised air to the bottle blowing unit. The air conditioning unit is provided for conditioning air present in the bottling room.

By the integration of the entire bottling plant into a container, the bottling plant becomes easily transportable to any location of need anywhere in the world and can be started up quickly upon arrival.

By the division into a bottling room and a technical room, separated by the separation wall, conditions can be achieved in the bottling room which comply with international regulations on hygiene, safety, heat and noise.

By providing a unit for every step in the bottling process, meaning that every step in the bottling process is performed by a machine or apparatus without manual intervention, a complete bottling plant can be achieved which can run substantially without manual intervention. This contributes to hygiene as no continuous presence of an operator in the bottling room is required.

In preferred embodiments of the invention, the preform feeder is placed adjacent to the first lateral side, the bottle blowing unit is placed adjacent to the separation wall and the filling and closing unit is placed adjacent to the second lateral side. By this organisation of the units in the bottling room, a compact layout can be achieved, so that the plant can be integrated into a container of limited size, while all units still remain accessible for supervisors.

In preferred embodiments of the invention, the power generator, air compressor and air conditioning unit are placed on different levels inside the technical room, the power generator being adapted to fit inside a space left by the air compressor and the air conditioning unit. By this organisation and modification of the units in the technical room, the size of the technical room can be limited, so that the plant can be integrated into a container of limited size.

In preferred embodiments, the bottle blowing unit is adapted to operate with pressurised air of at most 15 bar. This implies that an air compressor which is capable of supplying pressurised air of 15 bar is sufficient. Such compressors are of much smaller size than other compressors which are provided for supplying pressurized air of 20 bar or more. So in this embodiment a much smaller compressor can be used, which has the advantage that space can be saved in the technical room and the plant can be integrated into a container of limited size.

In preferred embodiments, the container is a standard ISO 20 ft container. A transportable bottling plant of such a small size can be achieved by restricting to 15 bar. Preferably also one or more of the other features mentioned in the former paragraphs is implemented to save space. However, when the size of the container is of lesser importance and for example it is desired to operate at higher air pressures above 15 bar, larger containers are also possible according to the invention, such as for example a standard ISO 30 ft, 40 ft or 45 ft container.

In preferred embodiments, one or more hatches is/are provided at the front side of the container adjacent to the recipient of the preform feeder and/or a cap recipient of the filling and closing unit and/or a handle recipient of the filling and closing unit. This hatch/hatches are provided for user supply of the "consumables", i.e. the plastic bottle preforms, bottle caps, bottle handles and/or labels, from outside the bottling room. A lock is preferably provided at the front side of the container adjacent to the filling and closing unit, for passing filled and closed bottles towards the outside of the bottling room. As a result of these hatches and the lock, operation of the transportable bottling plant as a "closed box" can be obtained, which means that operators do not have to enter the bottling room while the plant is in operation to supply the consumables and to remove the filled and closed bottles. This has the advantage that hygiene can be enhanced, as the risk of contamination by the operator or consumable packaging entering the bottling room is minimised.

The filling and closing unit preferably comprises a conveyor belt extending from the second transferring unit up to the lock, where the filled and closed bottles are passed to the outside of the bottling room, for example onto an accumulation conveyor positioned at the lock on which the bottles can be accumulated for further handling by the operators.

In preferred embodiments, the filling and closing unit comprises liquid infeed and outfeed ducts connected to liquid infeed and outfeed connectors which are provided in one of the sides of the container, so that they are accessible from outside the bottling room. The liquid infeed connector is provided for feeding the liquid with which the bottles are to be filled. The liquid infeed and outfeet connectors together can also be used to create a closed loop for a cleaning product. So by means of the liquid infeed and outfeed connectors accessible from outside the bottling room, both the liquid supply during operation and the supply and discharge of cleaning product during cleaning can be effected from outside the bottling room. This has the advantage that hygiene can be enhanced, as the risk of contamination by operators entering the bottling room is minimised in view of the fact that there is no need for an operator to enter the bottling room for the supply of either the liquid with which the bottles are to be filled or the cleaning product.

In preferred embodiments, the filling and closing unit comprises a system for treatment of the liquid with chemicals before filling the bottles, the liquid treatment system comprising a chemicals supply duct connected to a chemicals infeed connection provided in one of the sides of the container, so that it is accessible from outside the bottling room. So by means of the chemicals infeed connection accessible from outside the bottling room, the supply of chemicals for the treatment of the liquid in the liquid treatment system can be effected from outside the bottling room. This has the advantage that hygiene can be enhanced, as the risk of contamination by operators entering the bottling room is minimised in view of the fact that there is no need for an operator to enter the bottling room for the supply of the chemicals for the liquid treatment.

In preferred embodiments, the bottle blowing unit is provided with a cooling circuit for circulating a cooling liquid through parts of the bottle blowing unit, the cooling circuit being connected to a heat exchanger which is further connected to supply ducts via which the liquid with which the bottles are to be filled is supplied to the filling and closing unit. This heat exchanger is provided for heat transfer from the cooling liquid to the liquid with which the bottles are to be filled. This has the advantage that the liquid with which the bottles are to be filled is used as a cold source for cooling the cooling liquid, which in turn cools parts of the bottle blowing unit. As a result, a separate cold source or a chilling device for cooling the cooling liquid can be omitted, so that space can be saved in the bottling room and furthermore the overall power consumption can be reduced.

In preferred embodiments, the heater of the bottle blowing unit is provided with a heated air discharge conduit leading towards the outside of the bottling room, i.e. extending through the separation wall or another wall of the container. This discharge conduit is provided for discharging the heated air from heater, so that it does not enter the bottling room. As a result, any temperature increase inside the bottling room (which is cooled by the air conditioning unit) as a result of the operation of the heater can be minimised. Hence unnecessary power consumption of the air conditioning unit for cooling the air in the bottling room can be avoided.

BRIEF DESCRIPTION OF THE DRAWINGS

The invention will be further elucidated by means of the following description and the appended drawings.

MODES FOR CARRYING OUT THE INVENTION

Figure 1:
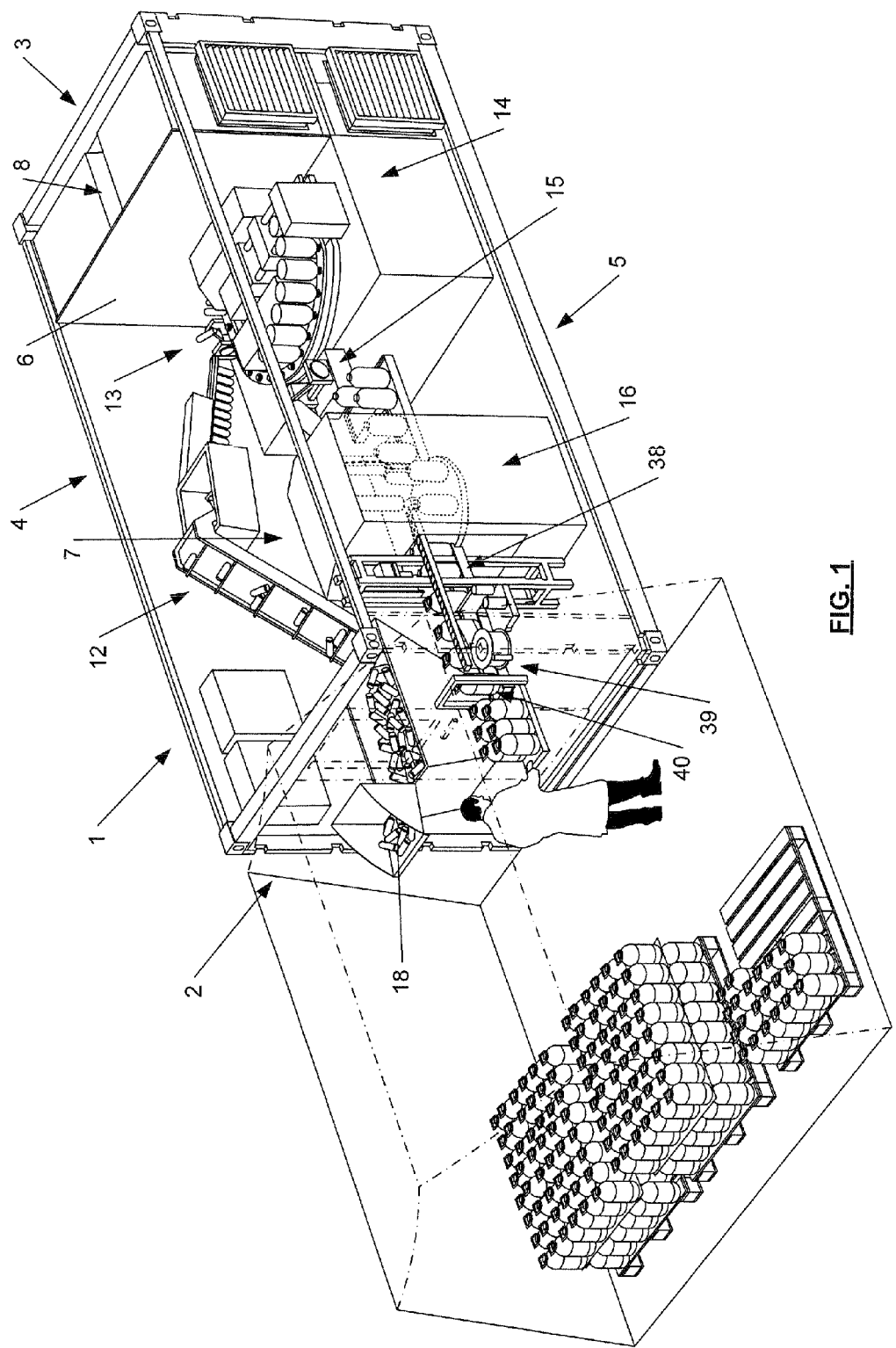
FIG. 1 shows a perspective view of a transportable bottling plant according to a first preferred embodiment of the invention.

The present invention will be described in the following with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Below, a preferred embodiment of a transportable bottling plant is described which is tailored for supplying bottles filled with drinking water. However, with minor modifications, the bottling plant can be used for filling bottles with other liquids, such as for example wine, motor oil, etc.

The transportable bottling plant shown in FIG. 1 is integrated into a container 1, in particular a standard ISO 20 ft container. In this way, the plant is adapted for being quickly transported to a place of need, which can for example be a place struck by a calamity, a remote place where military operations take place (e.g. desert), a stationary bottling plant which has insufficient capacity to meet the demand, or other.

The container 1 has a front side 2 opposite a back side 3, which form the shorter sides of the container, and two opposite lateral sides 4 and 5, which form the longer sides of the container. The container 1 has a separation wall 6 which divides the interior of the container into a bottling room 7 and a technical room 8. The bottling room 7 contains all the electrically powered units for manufacturing closed and filled drinking water bottles starting from a supply of consumables, in particular plastic bottle preforms, bottle caps, bottle carrying handles and labels, and a supply of drinking water. The technical room 8, shown in FIG. 2, contains an air compressor 9 for supplying pressurised air, the condenser part 10 of an air conditioning system for conditioning/cooling the air in the bottling room and a fuel driven electric power generator 11 for generating the electric power for the units in the bottling room 7 and also the compressor and the air conditioning system. By this division into the bottling room 7 and the technical room 8, separated by the separation wall 6, conditions can be achieved in the bottling room which comply with international regulations on hygiene, safety, heat and noise.

The compressor 9 is provided for supplying pressurised air of 15 bar, which implies that the plant can be used for making bottles of up to 5 l from suitable preforms. For larger bottles, a higher air pressure is needed. The bottling plant of FIG. 1 is shown making 5 l bottles but can with minor modifications also be used for making bottles of for example 1, 1.5, 2 l or any volume from 0.25 up to 5 l. In particular, for the smaller bottles a different mould is used and the handle applicator is usually not used.

Figure 2:
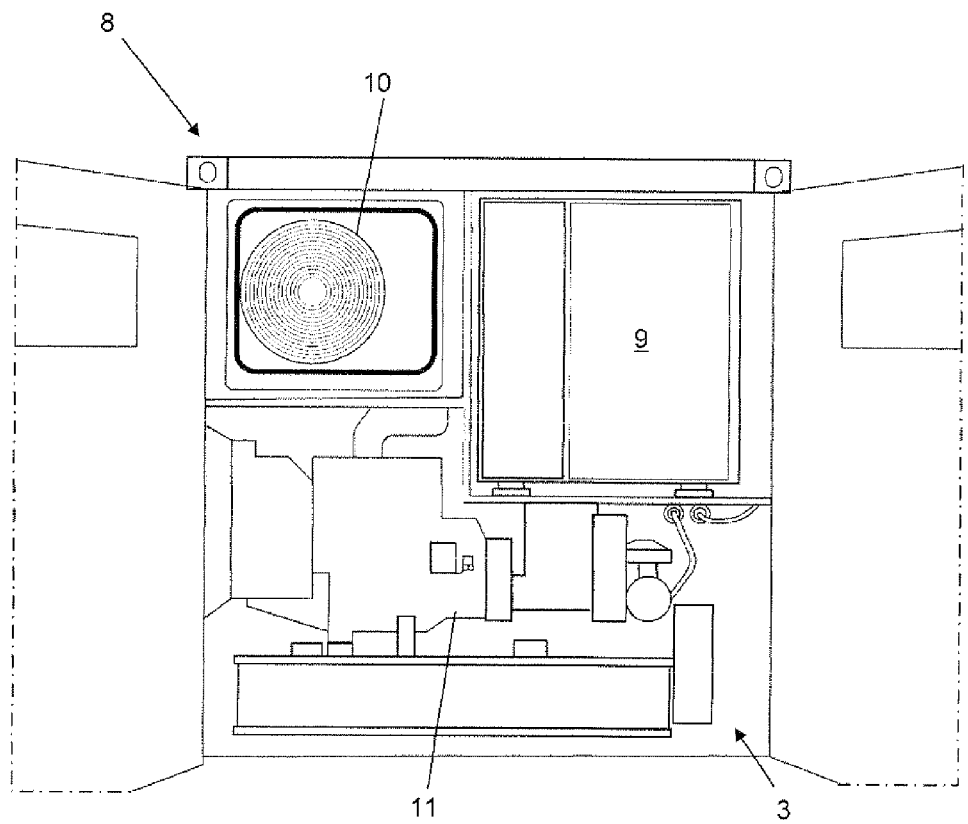
FIG. 2 shows a rear view of the transportable bottling plant of FIG. 1.

The air compressor 9 has to be able to sustain a reliable supply of pressurised air at 15 bar also in extreme conditions (e.g. 55° C. and 85% humidity). In order to meet this objective, the inventors preferred an air compressor of 18.5 kW power for the plant in the 20 ft container. In order to be able to have this amount of electric power available and sufficient power left for the other parts of the plant in the 20 ft container, the inventors preferred a power generator 11 having a power of 50 kVA (40 kW), driven by a 4 cylinder, 84 horsepower engine. The inventors then faced a challenge to fit these devices, along with the condenser part 10 of the air conditioning (which is also quite large), into a small technical room 8, so that a bottling room 7 would remain available which is large enough to fit the units of the actual bottling plant. This has been achieved, as is shown in FIG. 2, by placing the air compressor 9 and the air conditioning condenser unit 10 in upper compartments in the technical room 8, and the power generator 11 in the lower compartment which is basically the space left by the air compressor 9 and the air conditioning condenser unit 10. Furthermore, some modifications were done to the power generator 11 to fit it in the available space. As a result of these steps, a technical room 8 having a depth of only about 1 m is achieved.

The separation wall 6 provides both a thermal and an acoustic isolation between the bottling room 7 and the technical room 8. The wall preferably comprises a rockwool plate of 80 or 100 mm, such as for example the "Marine Slab 55" available from manufacturer Rockwool Technical insulation NV.

The air conditioning system shown in FIG. 2 is of the split type having a separate condenser unit 10 in the technical room and evaporator unit (not shown) inside the bottling room 7 against the separation wall 6. Alternatively, the air conditioning system could also be a unitary system, mounted in the same compartment of the technical room as the condenser unit 10 with then a grid towards the bottling room 7.

Generally, the following units are provided in the bottling room 7: a preform feeder 12 for feeding and ordering the plastic bottle preforms, a first transferring device 13, a bottle blowing unit 14 for blowing plastic bottles from the preforms, a second transferring device 15 and a filling and closing unit 16. Together, these units provide a unit for every step in the bottling process, so that the bottling plant can run substantially without manual intervention. This also contributes to hygiene as no continuous presence of an operator in the bottling room is required. In the following, the units 12-16 will be described in more detail.

Figure 3:
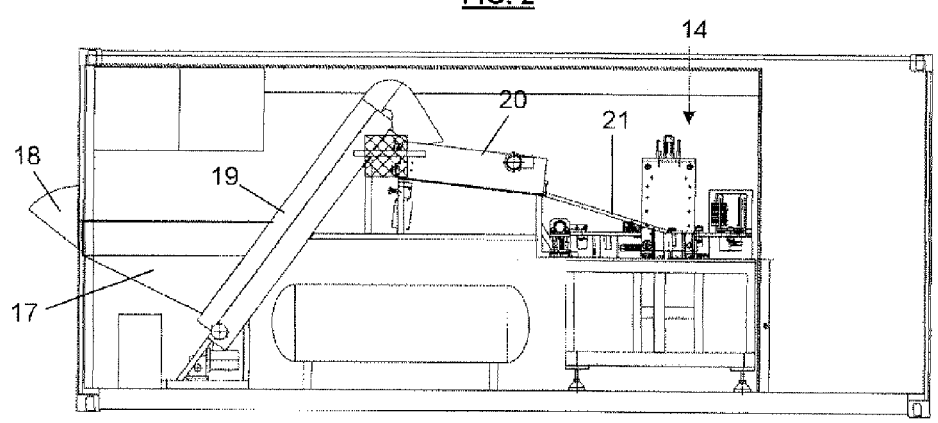
FIG. 3 shows a longitudinal cross-sectional view of the transportable bottling plant of FIG. 1.

The preform feeder 12, see FIG. 3, comprises a recipient 17 for receiving and buffering plastic bottle preforms. The recipient 17 is accessible via a first hatch 18 provided in the front wall 2 of the container. As shown in FIGS. 1 and 3, this first hatch 18 has a door which is tiltable around its bottom side up to a slanting position in which it forms a slide towards the recipient 17, so that an operator can easily throw in preforms from outside the bottling room 7 by emptying boxes of preforms onto the slide. The preforms present in the recipient 17 are picked up by a conveyor belt 19 and fed to an ordering unit 20. The ordering unit 20 arranges the preforms with their neck pointing upwards onto a slide/hopper 21, on which the preforms are transported towards the bottle blowing unit 14.

Figure 4:
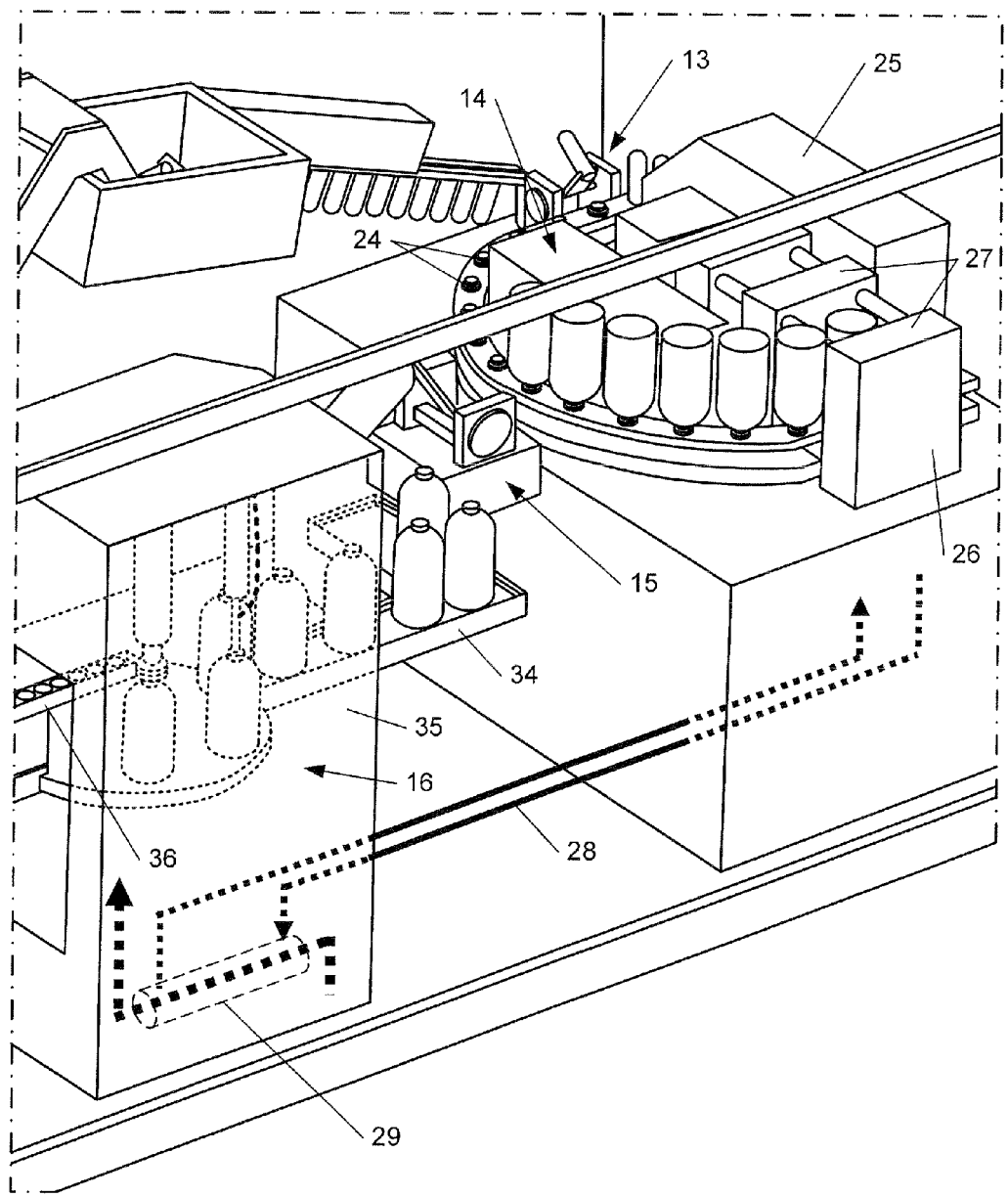
FIG. 4 shows a detail of a part of FIG. 1.

The first transferring device 13, shown in detail in FIG. 4, comprises a 180° rotatable arm with a gripping mechanism, by means of which the preforms are picked up one by one at their neck and placed upside down, i.e. with their neck pointing downwards onto preform/bottle holders 24 of the bottle blowing unit 14. Turning the preforms upside down at this stage has the advantage that any dirt present in the preforms can fall out.

The bottle blowing unit 14, shown in detail in FIG. 4, comprises an array of preform/bottle holders 24 which are coupled in a semi-circular chain. On this chain, the preforms are first moved into a heater 25 for heating up the preforms to the extent that the material of the bodies of the preforms becomes mouldable. This heater 25 is located at the straight part of the semi-circular chain. The chain of holders 24 is carried out in such a way that the distance between the holders 24 is minimal in the straight part of the chain, so that the preforms travel through the heater at a slow pace and remain a longer period of time in the heater 25. This has the advantage that the heating of the preforms to the desired level can be achieved with less power. A cooling system (not shown) is provided in the lower part of the heater for cooling the neck portions of the preforms in the heater. The fact that the preforms are held upside down while they are moved through the heater 25 has the advantage of avoiding that the necks of the preforms are heated up by the bodies (as hot air rises). This minimises the risk of deformation of the necks in subsequent stages of the bottling process. In the semi-circular part of the chain, i.e. as soon as the preforms have exited the heater, the distance between the holders 24 is increased, so that sufficient space is present between subsequent preforms for being able to blow the preforms to bottles. This is done in the blow-moulder 26, where pressurised air of 15 bar is applied through the holders 24 to the interior of the preforms to blow the now mouldable material of the preforms against the interior of a mould 27, which defines the shape of the bottles. The mould 27 comprises two mould halves which are moved back and forth to open and close the mould.

The mould 27 is cooled by means of a cooling circuit 28 which circulates a cooling liquid through the mould 27 and also the neck cooling system in the heater 25. The cooling circuit 28 is connected to a heat exchanger 29 which is in turn connected to supply ducts via which the drinking water is supplied to the filling and closing unit 16. This heat exchanger 29 comprises a double pipe with an inner pipe 30 conducting the drinking water and an outer pipe 31 conducting the cooling liquid. In this way, the double pipe is provided for transferring heat from the cooling liquid to the drinking water, before it enters the bottles. This cooling circuit 28 and heat exchanger 29 are schematically shown in FIG. 4, the thinner lines indicating the flow of the cooling liquid and the thicker lines indicating the flow of the drinking water. In view of the amount of drinking water which flows into the bottling room per time unit and the length of the heat exchanger 29, the cooling liquid circulating in the cooling circuit 28 can be sufficiently cooled in this way. Tests have shown that the heat transfer in the heat exchanger 29 leads to a temperature increase in the drinking water of only 1 to 2° C., which is negligible and does not affect the quality of the drinking water fed into the bottles.

Figure 5:
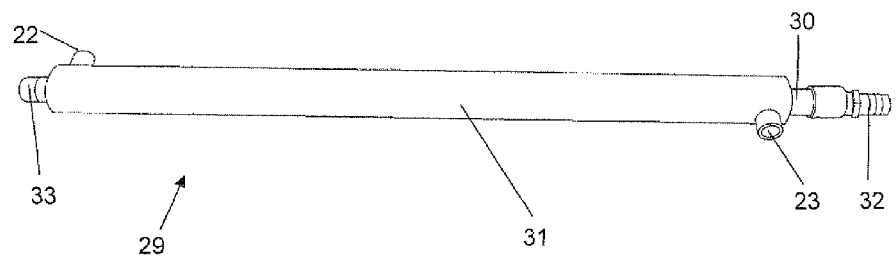
FIG. 5 shows a heat exchanger for use in the embodiment of FIG. 1.

The heat exchanger 29 itself is shown in FIG. 5. It comprises a double pipe with an inner pipe 30 with for conducting the drinking water and an outer pipe 31 conducting the cooling liquid. The inner pipe 30 comprises entrance and exit fittings 32, 33 for connecting drinking water conduits. The outer pipe 32 comprises entrance and exit fittings 22, 23 for connecting conduits of the cooling circuit 28.

The second transferring device 15, shown in detail in FIG. 4, comprises a 180° rotatable arm with a gripping mechanism, by means of which the bottles are picked up from the holders 24 one by one at their neck, turned over and placed upright, i.e. with their neck pointing upwards onto a conveyor belt 34 of the filling and closing unit 16.

Figure 6:
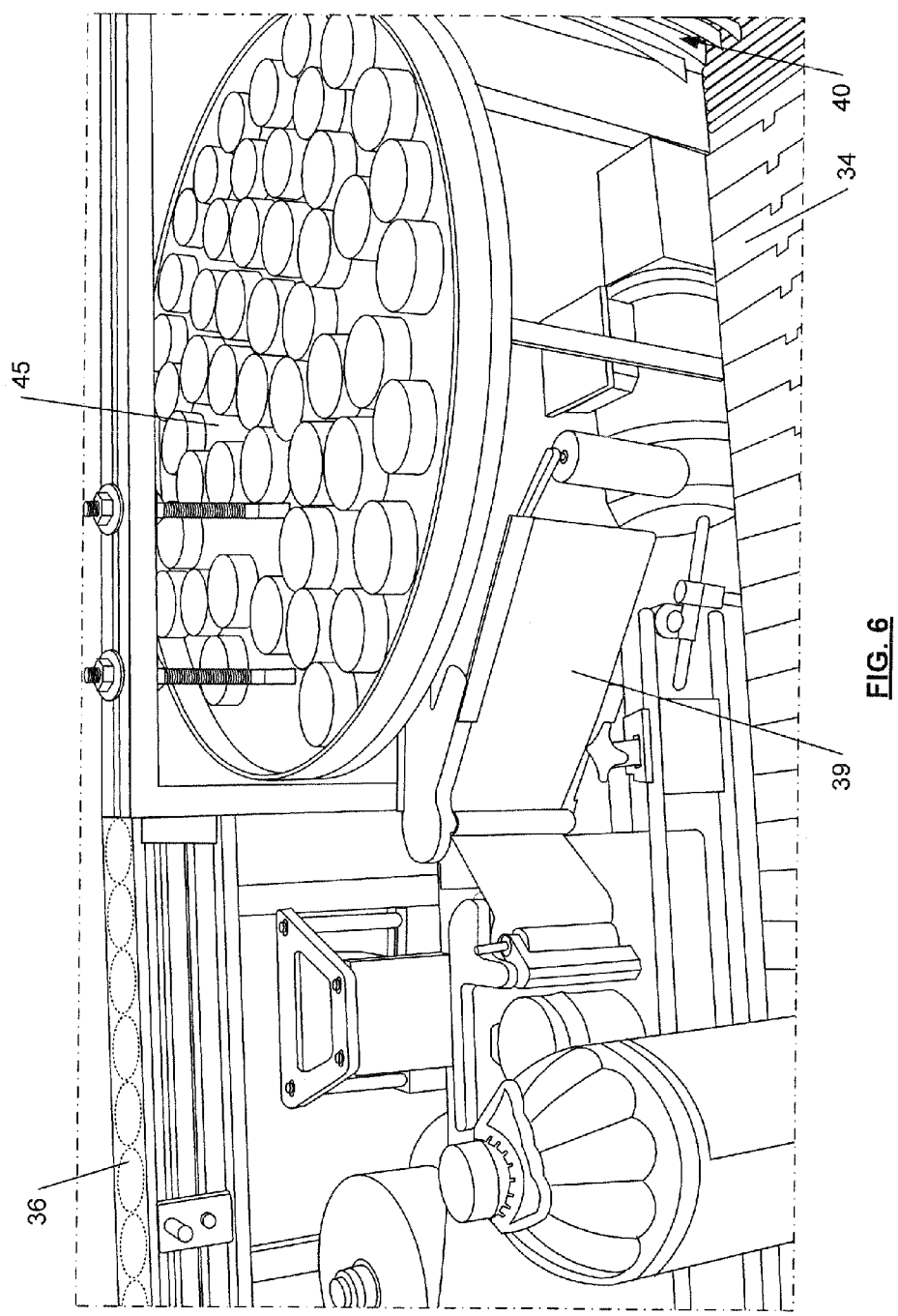
FIG. 6 shows a photograph of a labeller and a cap feeder with cap recipient of a reduction to practice of the embodiment of FIG. 1.
Figure 7:
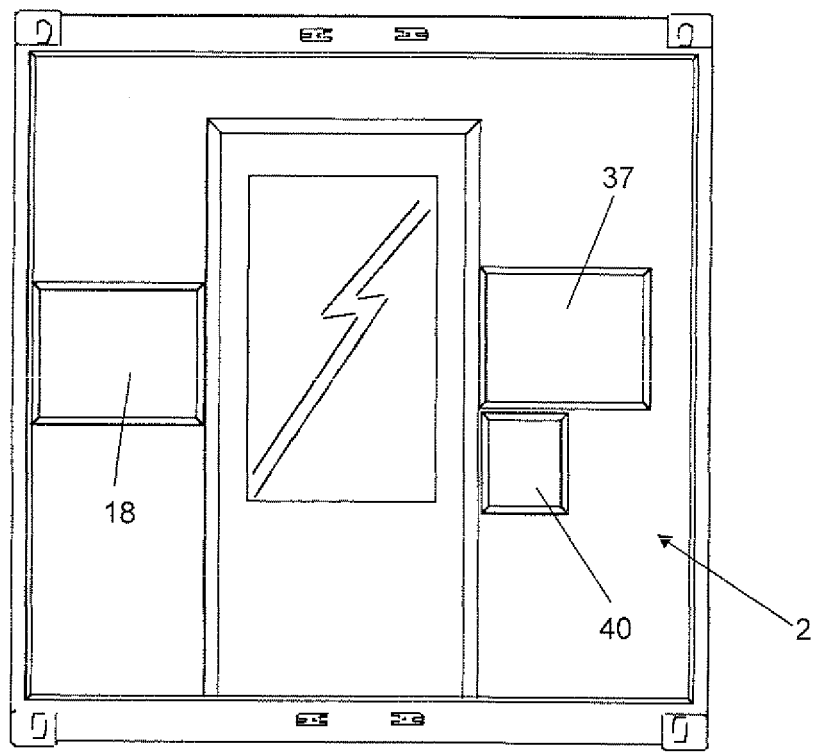
FIG. 7 shows a front view of the transportable bottling plant of FIG. 1.

The filling and closing unit 16, shown in detail in FIG. 4, comprises a glass housing 35 in which UV lamps (not shown) are provided for treatment of the drinking water, air, caps and bottles, and in which the filling operation takes place and the caps are screwed onto the bottles. Such UV treatment and the filling and closing operation are known from stationary bottling plants and therefore need no further description here. The filling and closing unit 16 has a cap feeder 36 which feeds the caps from a cap recipient 45 (see FIG. 6) into the glass housing 35. The cap recipient 45 is a rotating table on which the caps can be placed via a second hatch 37 in the front side 2 of the container (see FIG. 7), so that no operator has to enter the bottling room in order to supply caps to the cap recipient 45. The filling and closing unit 16 further has a handle recipient for feeding bottle carrying handles to a handle applicator 38. This handle applicator 38 is shown in FIG. 1 to be next to the glass housing 35, but can also be integrated into the glass housing 35. The filled and closed bottles exiting the glass housing on the conveyor belt 34 then pass a labeller 39 (see FIG. 6) which applies a label to the bottle and prints a code identifying lot number and date onto the bottle. The finished bottles are transferred from the conveyor belt 34 inside the bottling room, passing a lock 40 in the front side of the container, towards an accumulation conveyor (not shown) outside the bottling container for further handling operations. This accumulation conveyor can be provided for being linked to the conveyor belt 34 and can for example be stored in the interior of the bottling room 7 during transportation or when not in use.

The filling and closing unit 16 is provided with a water purification system (not shown), which is located in the space beneath the labeller 39.

Figure 8:
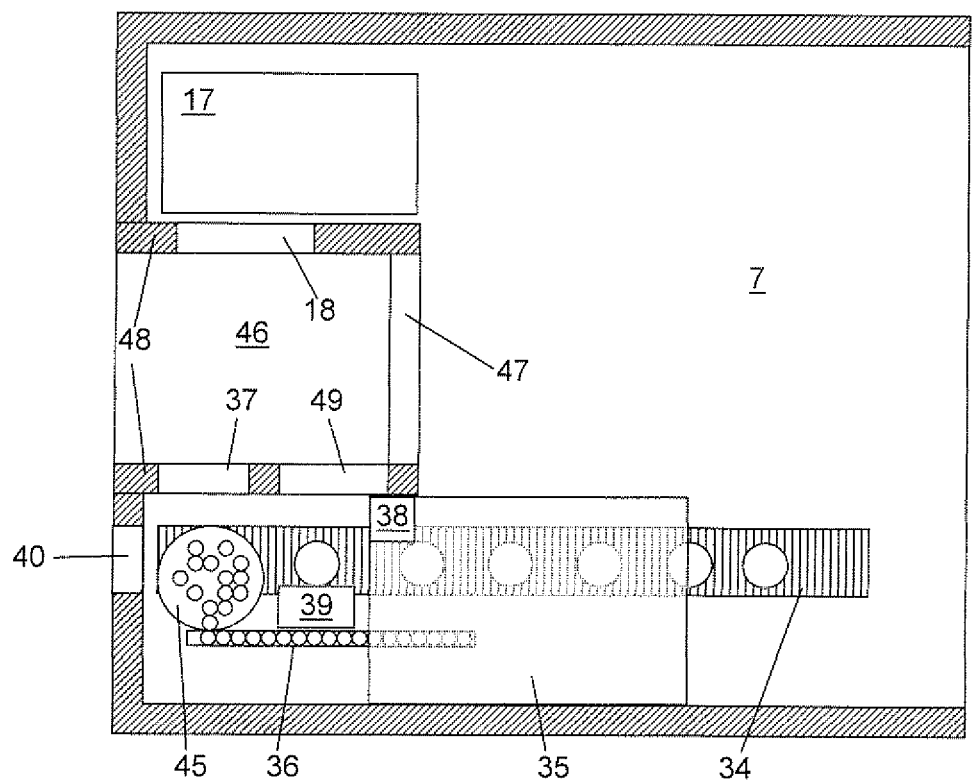
FIG. 8 shows a schematical top view of an alternative embodiment of the transportable bottling container of the invention.

In the embodiment shown in FIG. 1, an operator has to enter the bottling room for supplying handles and labels. This happens not very often and does not pose a high risk for contamination of the bottling room 7. This already limited risk for contamination can be further reduced with the embodiment schematically shown in FIG. 8, where the door 47 is moved towards the inside of the container, leaving a niche 46 at the front side with side walls 48. These side walls 48 are provided with a first hatch or window 18 giving access to the preform recipient 17, a second hatch or window 37 giving access to the cap recipient 45 and a third hatch or window 49 giving access to the handle applicator 49 and the labeller 39. As a result, all consumables can be supplied without accessing the bottling room 7.

In order to be able to sterilize all parts in contact with the drinking water (piping, purification unit, filler, pumps, buffers, etc. . . . ) on a regular basis to eliminate germs and bacteria, a tailor made 'Clean in Place' (CIP) system is provided in the filling and closing unit 16. The drinking water infeed connection 41 is used also as entrance for the cleaning product and is positioned in the outside wall of the container, see FIG. 9. A separate outfeed connection 42, also positioned in the outside wall of the container, is used to evacuate the cleaning product. By means of these connections 41, 42, a closed loop can be made for the cleaning product from outside the container, so that the cleaning product can recirculate for better cleaning with less product. These connections 41, 42 are accessible at the outside of the container, more particularly on the second lateral side 5, which avoids that cleaning product has to be brought inside the bottling room, which is advantageous for safety reasons, for easy operation and for eliminating possible chemical contamination inside the container.

Likewise, the infeed connection 43 for the water treatment chemicals for the water purification system is positioned in the outside wall 5 of the container, with a pump inside the container. This avoids water treatment chemicals to be brought inside the bottling room, which is advantageous for safety reasons, for easy operation and for eliminating possible chemical contamination inside the container.

Figure 9:
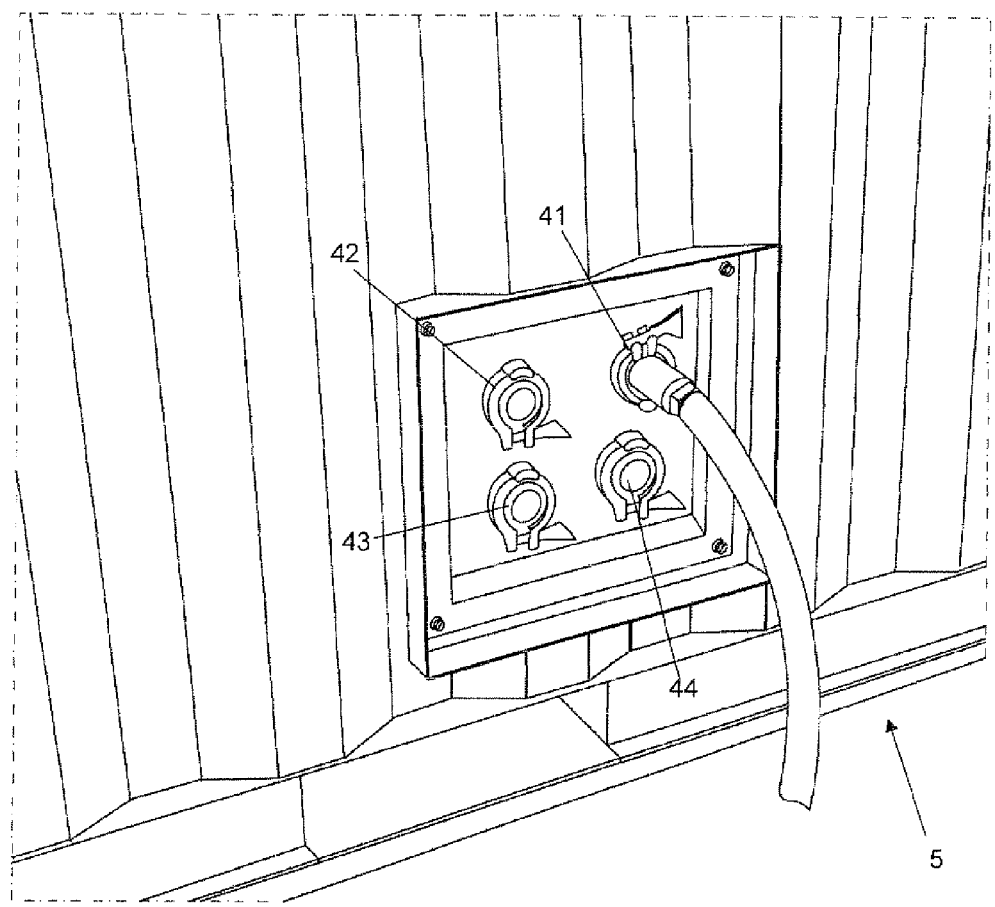
FIG. 9 shows a perspective view of part of a lateral side of the transportable bottling container of FIG. 1.

The fourth connection 44 shown in FIG. 9 is for a discharge of any overflow which may occur in the container during the operation.

The front side 2 and back side 3 of the container are provided with conventional container doors by means of which the bottling room and the technical room can be closed off for the purposes of transportation.

Figure 10:
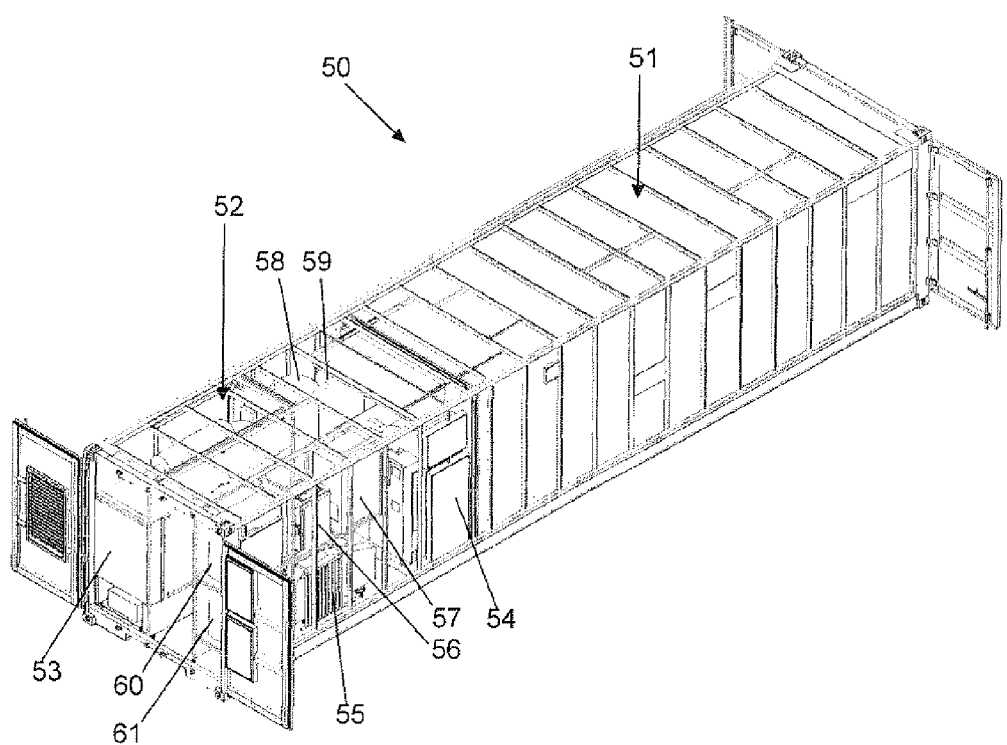
FIG. 10 shows a perspective view of a transportable bottling plant according to a second preferred embodiment of the invention.

FIG. 10 shows an alternative embodiment of the transportable bottling plant of the invention. In this embodiment, the container is a standard ISO 40 ft container. This plant is designed for making bottles of 10 l and uses pressurised air of 20-25 bar. As the length of this container is twice the length of the 20 ft embodiment described above, space is not such a critical issue for this embodiment. The bottling room of this plant is similar to the one of the 20 ft embodiment described above and will hence not be further described here. In the following, the technical room of this plant will be briefly described.

As shown on the figure, the technical room contains a power generator, an air compression system and air conditioning units. The air compression system is divided into two devices, namely a first compressor pressurising air up to 8 bar and a second compressor pressurising air from 8 bar up to 20-25 bar. Each compressor has its own air dryer. Two air conditioning systems are provided, one for the bottling room and another for the technical room. The latter is provided in view of the fact that the efficiency and reliability of air compressors decreases at high temperatures, so by also cooling the technical room in this case, reliability and efficiency of the plant can be enhanced.

REFERENCE LIST

1 Container
2 Front side
3 Back side
4 First lateral side
5 Second lateral side
6 Separation wall
7 Bottling room
8 Technical room
9 Air compressor
10 Air conditioning condenser unit
11 Power generator
12 Preform feeder
13 First transferring device
14 Bottle blowing unit
15 Second transferring device
16 Filling and closing unit
17 Recipient
18 First hatch
19 Conveyor belt
20 Ordering unit
21 Slide/hopper
22 Entrance fitting
23 Exit fitting
24 Preform/bottle holder
25 Heater
26 Blow-moulder
27 Mould
28 Cooling circuit
29 Heat exchanger
30 Inner pipe
31 Outer pipe
32 Entrance fitting
33 Exit fitting
34 Conveyor belt
35 Glass housing
36 Cap feeder
37 Second hatch
38 Handle applicator
39 Labeller
40 Lock
41 Drinking water/cleaning product infeed connection
42 Cleaning product outfeed connection
43 Chemicals infeed connection
44 Overflow discharge connection
45 Cap recipient
46 Niche
47 Door
48 Side walls
49 Third hatch
50 Container
51 Bottling room
52 Technical room
53 Power generator
54 First compressor
55 Second compressor
56 Air dryer
57 Air dryer
58 Buffer tank
59 Buffer tank
60 Air conditioning system
61 Air conditioning system

The invention claimed is:

1. Transportable bottling plant comprising:
a container having a front side, a back side, first and second lateral sides connecting the front and back sides, and a separation wall dividing the container into a bottling room at the front side and a technical room at the back side, wherein the entire bottling plant is integrated into the container and provides a set of units together configured for performing every step in a bottling process, such that the transportable bottling plant is easily transportable to any location and can be started up quickly upon arrival without removal of any of said set of units from the bottling room;
a preform feeder, a bottle blowing unit, a filling and closing unit and first and second transferring devices which are mounted in the bottling room and together form said set of units;
a power generator, an air compressor and an air conditioning unit mounted in the technical room;
wherein the preform feeder comprises a recipient for receiving plastic bottle preforms and an ordering unit for ordering the preforms and feeding them towards the bottle blowing unit;
wherein the first transferring device is provided for transferring the preforms from the preform feeder to the bottle blowing unit;
wherein the bottle blowing unit comprises a heater for heating the preforms and a blow-moulder for blow-moulding the preforms into bottles;
wherein the second transferring device is provided for transferring the bottles from the bottle blowing unit to the filling and closing unit;
wherein the filling and closing unit comprises a filling unit for filling the bottles with a liquid and a closing unit for closing the bottles with caps;
wherein the power generator is electrically connected with the units mounted in the bottling room and is provided for generating electric power therefore;
wherein the air compressor is provided for compressing air and supplying the pressurized air to the bottle blowing unit;
and wherein the air conditioning unit is provided for conditioning air present in the bottling room.

2. Transportable bottling plant according to claim 1, wherein the preform feeder is placed adjacent to the first lateral side, the bottle blowing unit is placed adjacent to the separation wall and the filling and closing unit is placed adjacent to the second lateral side.

3. Transportable bottling plant according to claim 1, wherein the power generator, air compressor and air conditioning unit are placed on different levels inside the technical room, the power generator being adapted to fit inside a space left by the air compressor and the air conditioning unit.

4. Transportable bottling plant according to claim 1, wherein the bottle blowing unit is adapted to operate with pressurized air of at most 15 bar.

5. Transportable bottling plant according to claim 4, wherein the container is a standard ISO 20 ft container.

6. Transportable bottling plant according to claim 1, wherein the container is a standard ISO container of more than 20 ft.

7. Transportable bottling plant according to claim 1, wherein a first hatch is provided at the front side of the container adjacent to the recipient of the preform feeder, the first hatch being for user supply of plastic bottle preforms from outside the bottling room.

8. Transportable bottling plant according to claim 1, wherein a second hatch is provided at the front side of the container adjacent to a cap recipient of the filling and closing unit, the second hatch being for user supply of bottle caps from outside the bottling room.

9. Transportable bottling plant according to claim 1, wherein a third hatch is provided at the front side of the container adjacent to a handle recipient and/or a labeler of the filling and closing unit, the third hatch being for user supply of bottle handles and/or bottle labels from outside the bottling room.

10. Transportable bottling plant according to claim 1, wherein a lock is provided at the front side of the container adjacent to the filling and closing unit, the lock being for passing filled and closed bottles towards the outside of the bottling room.

11. Transportable bottling plant according to claim 10, wherein the filling and closing unit comprises a conveyor belt extending from the second transferring device up to the lock.

12. Transportable bottling plant according to claim 1, wherein the filling and closing unit comprises liquid infeed and outfeed ducts connected to liquid infeed and outfeed connectors which are provided in one of the sides of the container, so that they are accessible from outside the bottling room.

13. Transportable bottling plant according to claim 1, wherein the filling and closing unit comprises a liquid treatment system for treatment of the liquid with chemicals before filling the bottles, the liquid treatment system comprising a chemicals supply duct connected to a chemicals infeed connection provided in one of the sides of the container, so that it is accessible from outside the bottling room.

14. Transportable bottling plant according to claim 1, wherein the bottle blowing unit is provided with a cooling circuit for circulating a cooling liquid through parts of the bottle blowing unit, the cooling circuit being connected to a heat exchanger which is further connected to supply ducts via which the liquid with which the bottles are to be filled is supplied to the filling and closing unit, the heat exchanger being provided for heat transfer from the cooling liquid to the liquid with which the bottles are to be filled.

15. Transportable bottling plant according to claim 1, wherein the heater of the bottle blowing unit is provided with a heated air discharge conduit leading towards the outside of the bottling room.

16. Transportable bottling plant according to claim 1, wherein the separation wall comprises an insulation plate providing both thermal and acoustic isolation between the bottling room and the technical room.

* * * * *